(12) United States Patent
Cohen et al.

(10) Patent No.: US 12,124,891 B2
(45) Date of Patent: Oct. 22, 2024

(54) SYSTEMS AND METHODS FOR STATELESS MAINTENANCE OF A REMOTE STATE MACHINE

(71) Applicant: GOOGLE LLC, Mountain View, CA (US)

(72) Inventors: Joseph Cohen, Mountain View, CA (US); Justin Lewis, Marina Del Rey, CA (US)

(73) Assignee: GOOGLE LLC, Mountain View, CA (US)

( * ) Notice: Subject to any disclaimer, the term of this patent is extended or adjusted under 35 U.S.C. 154(b) by 8 days.

(21) Appl. No.: 18/084,295

(22) Filed: Dec. 19, 2022

(65) Prior Publication Data

US 2023/0121242 A1    Apr. 20, 2023

Related U.S. Application Data

(63) Continuation of application No. 16/322,458, filed as application No. PCT/US2017/015457 on Jan. 27, 2017, now Pat. No. 11,573,843.

(Continued)

(51) Int. Cl.
*G06F 9/54* (2006.01)
*G06F 3/04847* (2022.01)
*G06F 9/451* (2018.01)

(52) U.S. Cl.
CPC .......... *G06F 9/542* (2013.01); *G06F 3/04847* (2013.01); *G06F 9/451* (2018.02); *G06F 9/547* (2013.01); *G06F 2209/545* (2013.01)

(58) Field of Classification Search
CPC ...... G06F 3/04847; G06F 9/451; G06F 9/542; G06F 9/547; G06F 2209/545
See application file for complete search history.

(56) References Cited

U.S. PATENT DOCUMENTS 6,311,206 B1   10/2001   Malkin et al.
7,877,766 B1   1/2011    Wu et al.
(Continued)

FOREIGN PATENT DOCUMENTS

CA    2 757 527 A1   5/2012
CN    105453048 A    3/2016
(Continued)

OTHER PUBLICATIONS

"Local and Remote Notification Programming Guide," Apple Inc., Oct. 21, 2015. (Year: 2015).
(Continued)

*Primary Examiner* — Eric J. Bycer
(74) *Attorney, Agent, or Firm* — MARSHALL, GERSTEIN & BORUN LLP

(57) ABSTRACT

Systems and methods of implementing a finite-state machine using electronic notifications delivered to a client device in a computer networking environment are provided. A content item can be received, along with first and second notifications associated with the content item. The first and second notifications can be stored in a queue. In some implementations, a state machine can be maintained in which at least some states may cause the first or second notifications to be displayed, and in which transitional conditions between states may depend at least in part on user interaction with the displayed notifications.

20 Claims, 6 Drawing Sheets

Related U.S. Application Data

(60) Provisional application No. 62/430,331, filed on Dec. 5, 2016.

(56) References Cited

U.S. PATENT DOCUMENTS

| | | | |
|---|---|---|---|
| 8,117,623 B1* | 2/2012 | Malasky | H04L 65/403 |
| | | | 719/329 |
| 8,468,056 B1 | 6/2013 | Chalawsky et al. | |
| 9,425,988 B2 | 8/2016 | Smith et al. | |
| 9,426,519 B1 | 8/2016 | Lewis et al. | |
| 9,942,177 B1 | 4/2018 | Ryabov et al. | |
| 11,573,843 B2 | 2/2023 | Cohen et al. | |
| 2004/0162880 A1 | 8/2004 | Arnone | |
| 2004/0254998 A1 | 12/2004 | Horvitz | |
| 2007/0192733 A1 | 8/2007 | Horiuchi et al. | |
| 2007/0214429 A1* | 9/2007 | Lyudovyk | G06F 3/048 |
| | | | 715/772 |
| 2009/0019507 A1 | 1/2009 | White et al. | |
| 2010/0217872 A1 | 8/2010 | Martchenko et al. | |
| 2011/0161863 A1* | 6/2011 | Rainisto | G06F 3/0481 |
| | | | 715/784 |
| 2011/0248863 A1 | 10/2011 | Johnson et al. | |
| 2012/0197419 A1 | 8/2012 | Dhruv et al. | |
| 2013/0086102 A1 | 4/2013 | Addala et al. | |
| 2013/0346521 A1 | 12/2013 | Arabo et al. | |
| 2015/0026324 A1 | 1/2015 | Rheinheimer et al. | |
| 2015/0026715 A1 | 1/2015 | Bernstein et al. | |
| 2016/0117057 A1* | 4/2016 | Smolinski | G06F 3/0481 |
| | | | 715/781 |
| 2017/0017351 A1 | 1/2017 | Singh et al. | |
| 2017/0083165 A1 | 3/2017 | Ali et al. | |
| 2017/0115858 A1* | 4/2017 | Lei | G09G 5/38 |
| 2019/0173969 A1 | 6/2019 | Lowry et al. | |
| 2019/0320442 A1 | 10/2019 | Thies et al. | |

FOREIGN PATENT DOCUMENTS

| | | |
|---|---|---|
| EP | 1 613 009 A1 | 1/2006 |
| EP | 1 986 086 A1 | 10/2008 |

OTHER PUBLICATIONS

"Method for Ensuring Event Notification while Maintaining Availability Policies and Response Times," IPCOM000124374D, Apr. 18, 2005. (Year: 2015).

"Notifications in Android 4.4 and Lower," Android Developers. (Year: 2015).

"Push Notification," Wikipedia, retrieved from https://en.wikipedia.org/w/index.php?title=Push notification&oldid=747018429, which was last edited on Oct. 30, 2016. (Year: 2016).

"Truth Table," Wikipedia, retrieved on Nov. 2, 2021 from https://en.wikipedia.org/w/index.php?title=Truth table&oldod= 750235986 (revision dated Nov. 18, 2016) (Year: 2016).

Anonymous, "Finite-State Machine," Wikipedia, Sep. 23, 2016.

Anonymous, "Local and Remote Notification Programming Guide," pp. 1-67, Mar. 9, 2015.

Anonymous, "Notifications in Android 4.4 and Lower," Android Developers, May 24, 2015.

Anonymous, "Push Notification," Wikipedia, Oct. 30, 2016.

Examination Report for EP Appln. Ser. No. 17706014.2 dated Feb. 5, 2021.

International Preliminary Report on Patentability for International Application No. PCT/US2017/015457, mail date Jun. 20, 2019, 7 pages.

International Search Report and Written Opinion for Application No. PCT/US2017/015457, dated May 12, 2017.

Uddin at al., "RichNote: Adaptive Selection and Delivery of Rich Media Notifications to Mobile Users," 2016 IEEE 36th International Conference on Distributed Computing Systems, 27-0 Jun. 2016, pp. 159-168. (Year: 2016).

Warren et al., "Push Notification Mechanisms for Pervasive Smartphone Applications," IEEE CS, Pervasive Computing, Apr.-Jun. 2014, pp. 61-71. (Year: 2014).

* cited by examiner

SYSTEMS AND METHODS FOR STATELESS MAINTENANCE OF A REMOTE STATE MACHINE

RELATED APPLICATIONS

This application claims priority to U.S. patent application Ser. No. 16/322,458, filed on Jan. 31, 2019 (now U.S. Pat. No. 11,573,843), which was a U.S. National Stage Entry Application of PCT/US2017/015457, filed on Jan. 27, 2017, which further claims priority to U.S. Provisional Application No. 62/430,331, filed on Dec. 5, 2016 and entitled "SYSTEMS AND METHODS FOR STATELESS MAINTENANCE OF A REMOTE STATE MACHINE," each of which are incorporated herein by reference in their entireties.

BACKGROUND

A system can be represented as a finite-state machine (sometimes referred to herein as a state machine). For example, in a computer networking environment, an application executing on a client device may be modeled as a state machine. The client device can send and receive information related to the application from a remote server. However, it can be computationally complex for both the server and the client to accurately maintain and update current information about the state machine, particularly when a stateless communication protocol is used.

SUMMARY

To reduce required bandwidth usage and computational complexity, an electronic notification queue can be used to implement the state machine representing the application. For example, one or more electronic notifications can be stored in the queue, and can be delivered to the user of the client device in an order that corresponds to the proper state transitions of the state machine. In some implementations, a notification may be delivered to the user of the client device as any form of visual information, such as a popup window. A notification may include information such as text, images, and interactive content such as hyperlinks or buttons, which the user may select in order to affect a state transition. Notifications can be delivered to the user in a first-in-first-out (FIFO) order. A notification can be removed from the queue at the time at which it is delivered to a user. In some implementations, delivery of a notification may simultaneously cause dismissal of any active notifications that are currently visible to the user, such that the user is not presented with multiple notifications at one time. Delivery and dismissal of notifications using the notification queue can occur based on conditions (e.g., user input or elapsed timer information) corresponding to the transition conditions for the state machine. Thus, the notification queue can be used to simplify the communications between the server and the client device required to properly render the application on the client device according to its associated state machine representation.

At least one aspect is directed to a method for maintaining a client-state machine via a notification queue. The method can include receiving, by an application executing on a computing device from a server, an identification of a content item, a first notification, and a second notification. The method can include storing, by the application, the first notification and the second notification in a notification queue in a memory of the computing device. The method can include determining, by the application responsive to display of the content item by a second application executing on the computing device, that the computing device is in a first state. The method can include determining, by the application responsive to a portion of the content item being not visible on a display screen of the computing device, that the computing device is in a second state. The method can include displaying, by the application, the first notification on the display screen of the computing device. The first notification can be removed from the notification queue. The method can include determining, by the application responsive to expiration of a timer, that the computing device is in a third state. The method can include dismissing, by the application responsive to the determination that the computing device is in the third state, the first notification. The method can include displaying, by the application, the second notification on the display screen of the computing device. The second notification can be removed from the notification queue.

In some implementations, the content item can include video content. In some implementations, the method can include setting the timer, responsive to display of the content item by the second application, to a predetermined value corresponding to a duration of a non-skippable portion of the video content.

In some implementations, the first notification can include a first user interface element. The method can further include detecting, by the application while the computing device is in the second state, an interaction with the first user interface element. The method can further include activating a window of the second application comprising the video content, responsive to detecting the interaction with the first user interface element.

In some implementations, the first notification can include a second user interface element. The method can further include detecting, by the application, an interaction with the second user interface element. The method can further include providing a command to pause the video content, by the application to the second application, responsive to detecting the interaction with the second user interface element.

In some implementations, the first notification can include a third user interface element. The method can further include detecting, by the application, an interaction with the third user interface element. The method can further include providing a command to transmit a request for a second content item, by the application to the second application, responsive to detecting the interaction with the third user interface element.

In some implementations, the second notification can include a fourth user interface element. The method can further include detecting, by the application, an interaction with the fourth user interface element. The method can further include providing a command to skip a remainder of the video content, by the application to the second application, responsive to detecting the interaction with the fourth user interface element.

In some implementations, the notification queue can store a third notification. The method can further include removing, by the application responsive to the determination that the computing device is in the first state, the third notification from the queue. In some implementations, displaying, by the application, the first notification on the display screen of the computing device can further include sending, by the application, a remote procedure call (RPC) to a second server, the RPC including information identifying the computing device and causing the second server to send the first notification to the computing device. In some implementations, the method can further include activating the timer substantially concurrent with display of the content item.

At least one aspect is directed to a system for maintaining a client-state machine via a notification queue. The system can include a client device comprising a processor executing a notification application, a second application, and a timer. The system can include a memory device comprising a notification queue. The system can include a network interface communicatively coupled to a server. The network interface can be configured to receive, from the server, an identification of a content item, a first notification, and a second notification. The notification application can be configured to store the first notification and the second notification in the notification queue. The notification application can be configured to determine, responsive to display of the content item by the second application, that the client device is in a first state. The notification application can be configured to determine, responsive to a portion of the content item being not visible on a display screen of the client device, that the client device is in a second state. The notification application can be configured to display the first notification on the display screen of the client device, the first notification removed from the notification queue. The notification application can be configured to determine, responsive to expiration of the timer, that the client device is in a third state. The notification application can be configured to dismiss, responsive to the determination that the client device is in the third state, the first notification. The notification application can be configured to display the second notification on the display screen of the client device, the second notification removed from the notification queue.

In some implementations, the content item can include video content. In some implementations, the timer can be configured with a predetermined duration corresponding to a non-skippable portion of the video content.

In some implementations, the first notification can include a first user interface element. The notification application can be further configured to detect, while the client device is in the second state, an interaction with the first user interface element. The notification application can be further configured to activate a window of the second application comprising the video content, responsive to detection of the interaction with the first user interface element.

In some implementations, the first notification can include a second user interface element. The notification application can be further configured to detect an interaction with the second user interface element. The notification application can be further configured to provide a command to pause the video content, responsive to detection the interaction with the second user interface element.

In some implementations, the first notification can include a third user interface element. The notification application can be further configured to detect an interaction with the third user interface element. The network interface can be further configured to transmit a request for a second content item, responsive to detection of the interaction with the third user interface element.

In some implementations, the second notification can include a fourth user interface element. The notification application can be further configured to detect an interaction with the fourth user interface element. The notification application can be further configured to provide a command to skip a remainder of the video content, responsive to detection of the interaction with the fourth user interface element.

In some implementations, the notification queue can store a third notification. The notification application can be further configured to remove, responsive to the determination that the client device is in the first state, the third notification from the notification queue. In some implementations, the network interface can be further configured to send a remote procedure call (RPC) to a second server. The RPC can include information identifying the client device and causing the second server to send the first notification to the client device. In some implementations, the timer can be further configured to activate substantially concurrent with display of the content item.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1A:
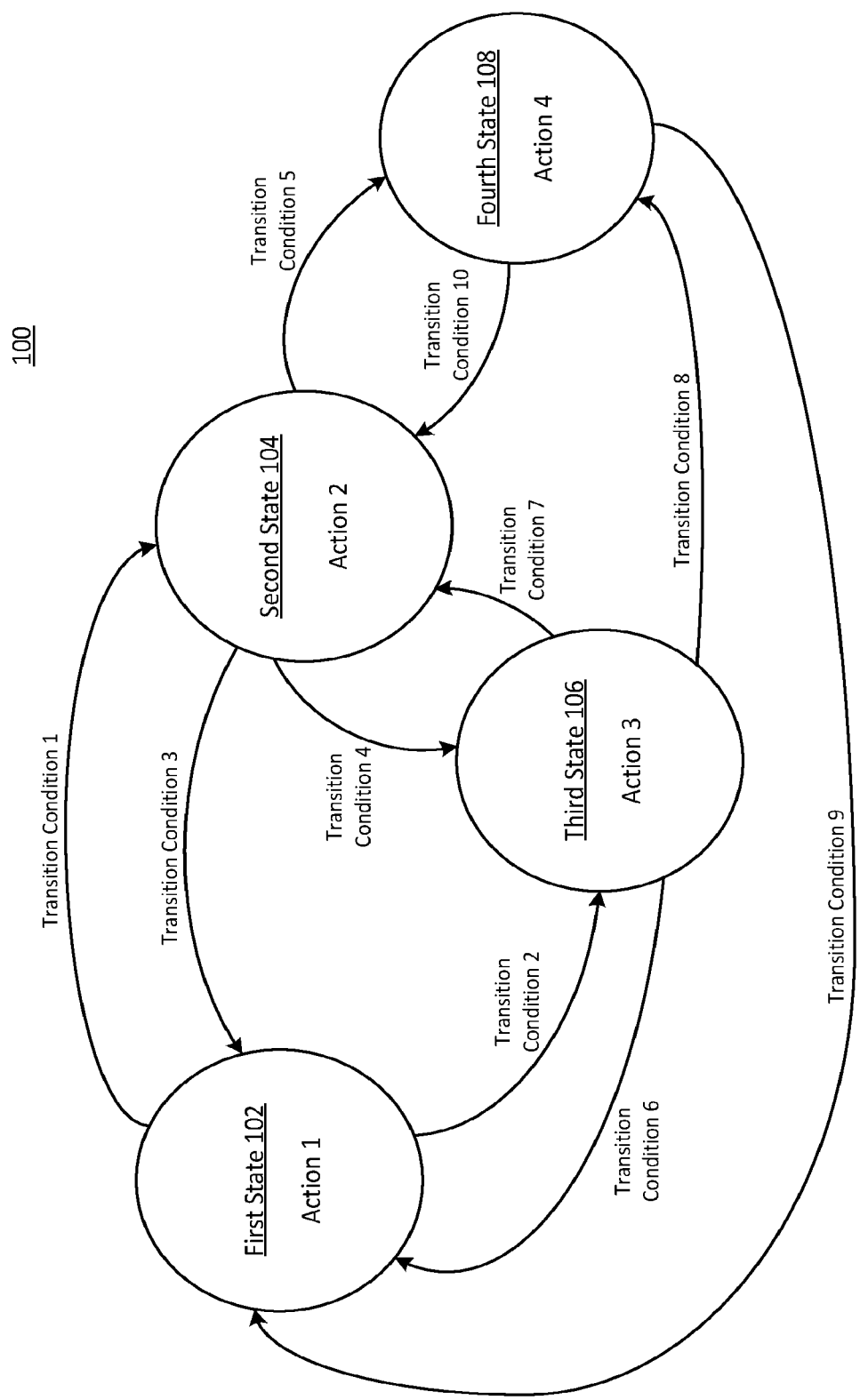
FIG. 1A is a state transition diagram for an example finite-state machine, according to an illustrative implementation.

The present disclosure is generally directed to systems and methods for implementing a finite-state machine using electronic notifications delivered to a client device in a computer networking environment. Many applications executed by (or rendered on) client devices in a computer networking environment can be modeled as state machines. That is, the behavior of an application can be represented and analyzed as a series of events that occur in one or more possible states. In general, the application will only exist in one state, referred to as the current state, at a given time. Transitions between states can occur as a result of a triggering event or condition. In some implementations, transitions between the various states of the state machine representing a computer application can occur as a result of an action taken by a user of the client device on which the application is rendered.

In some implementations, the application may be executed remotely, for example by a server communicatively coupled to the client device via a computer networking environment, such as the Internet. In implementations in which the application is interactive, information corresponding to actions taken by a user of the client device may be transmitted to the server and may cause the application to change its current state (i.e., to transition into a new state as a result of the action taken by the user). Thus, communications transmitted between the server and the client device may be essential to the functioning of the state machine representing the application. However, it can be difficult for both the client and the server to simultaneously maintain an accurate representation of the current state of the state machine. In particular, transmitting enough information between the server and the client device for both the server and the client device to maintain an accurate representation of the state machine may require significant bandwidth. Furthermore, when communications between the client device and the server are conducted according to a stateless communication protocol, it can be computationally complex for both the server and client device to maintain the state machine, which is required for the application to be rendered properly on the client device.

To reduce required bandwidth usage and computational complexity, an electronic notification queue can be used to implement the state machine representing the application. For example, one or more electronic notifications can be stored in the queue, and can be delivered to the user of the client device in an order that corresponds to the proper state transitions of the state machine. In some implementations, a notification may be delivered to the user of the client device as any form of visual information, such as a popup window. A notification may include information such as text. A notification may include an image or images. A notification may include interactive content such as hyperlinks or buttons. In some implementations, the user may select the interactive content in order to affect a state transition. Notifications can be delivered to the user in a first-in-first-out (FIFO) order in some implementations. A notification can be removed from the queue at the time at which it is delivered to a user. In some implementations, delivery of a notification may simultaneously cause dismissal of any active notifications that are currently visible to the user, such that the user is not presented with multiple notifications at one time. Thus, these implementations also provide an improved user interface for real-time interaction with notifications relating to the present state of the state machine, during use. In general, an active notification may refer to a notification that is currently displayed on a display screen of the client device. Delivery and dismissal of notifications using the notification queue can occur based on conditions (e.g., user input or elapsed timer information) corresponding to the transition conditions for the state machine. Thus, the notification queue can be used to simplify the communications between the server and the client device required to properly render the application on the client device according to its associated state machine representation.

Accordingly, the embodiments of this disclosure can address the technical problems associated with implementing a finite-state machine representing an application rendered on a client device in a computer networking environment.

FIG. 1A is a state transition diagram 100 for an example finite-state machine, according to an illustrative implementation. In some implementations, the state machine corresponding to the state transition diagram 100 may represent an application rendered on a client device in a computer networking environment. The state transition diagram 100 includes four states, including a first state 102, a second state 104, a third state 106, and a fourth state 108. In other implementations, the state machine may have fewer states, such as a first state 102, a second state 104, and a third state 106. In some implementations, the state machine may have more states, such as a fifth state (not illustrated). The state machine may accordingly have any number of states and transitions between states. Each state may include an associated action, which may correspond to events that occur when the state machine is in each of its respective states. Arrows between the states of the state transition diagram 100 represent the transition conditions that cause the state machine to transition from one state to the next. The operation of the state transition diagram 100 is described further below.

The state machine represented by the state transition diagram 100 begins in the first state 102, in which Action 1 is performed. In some implementations, Action 1 may be performed a single time upon entry into the first state 102, but may not be repeated while the state machine remains in the first state 102. In some other implementations, Action 1 may be performed repeatedly while the state machine is in the first state 102. In some implementations, Action 1 may correspond, for example, to an action performed within an application rendered on a client device. In some other implementations, Action 1 may correspond to an action performed outside of the application rendered on the client device (e.g., Action 1 may correspond to the display or removal of information presented to a user outside of the application). The state machine will remain in the first state 102 until either Transition Condition 1 becomes true or Transition Condition 2 becomes true. If Transition Condition 1 is true, the state machine will transition to the second state 104. If condition 2 is true, the state machine will transition to the third state 106.

In some implementations, Transition Conditions 1 and 2 may each correspond to the occurrence of an action performed by a user of the client device. In some other implementations, Transition Conditions 1 and 2 may instead correspond to conditions that exist independently from actions taken by the user. For example, Transition Conditions 1 and 2 may correspond to the passage of a predetermined amount of time or to a visibility condition of the application on a display screen of the client device.

The second state 104 includes an associated action, labeled Action 2 in FIG. 1A. Thus, Action 2 may be performed as a result of the transition into the second state 104. In some implementations, Action 2 may be performed a single time upon entry into the second state 104, but may not be repeated while the state machine remains in the second state 104. In some other implementations, Action 2 may be performed repeatedly while the state machine is in the second state 104. In some implementations, Action 2 may correspond, for example, to an action performed within an application rendered on a client device. In some other implementations, Action 2 may correspond to an action performed outside of the application rendered on the client device. For example, Action 2 may correspond to the display or removal of information presented to a user outside of the application. The state machine will remain in the second state 104 until one of Transition Conditions 3-5 becomes true. If Transition Condition 3 becomes true, the state machine will transition back to the first state 102. If Transition Condition 4 becomes true, the state machine will transition to the third state 106. If Transition Condition 5 becomes true, the state machine will transition to the fourth state 108.

Similar to the transition conditions described above, Transition Conditions 3-5 may each correspond to the occurrence of an action performed by a user of the client device. In some other implementations, Transition Conditions 3-5 may instead correspond to conditions that exists independently from actions taken by the user. For example, Transition Conditions 3-5 may correspond to the passage of a predetermined amount of time or to a visibility condition of the application on a display screen of the client device.

The third state 106 includes an associated action, labeled Action 3 in FIG. 1A. Action 3 may be performed as a result of the transition into the third state 106. In some implementations, Action 3 may be performed a single time upon entry into the third state 106, but may not be repeated while the state machine remains in the third state 106. In some other implementations, Action 3 may be performed repeatedly while the state machine is in the third state 106. In some implementations, Action 3 may correspond, for example, to an action performed within an application rendered on a client device. In some other implementations, Action 3 may correspond to an action performed outside of the application rendered on the client device. For example, Action 3 may correspond to the display or removal of information presented to a user outside of the application. The state machine will remain in the third state 106 until one of Transition Conditions 6-8 becomes true. If Transition Condition 6 becomes true, the state machine will transition to the first state 102. If Transition Condition 7 becomes true, the state machine will transition to the second state 104. If Transition Condition 8 becomes true, the state machine will transition to the fourth state 108.

Similar to the transition conditions described above, Transition Conditions 6-8 may each correspond to the occurrence of an action performed by a user of the client device. In some other implementations, Transition Conditions 6-8 may instead correspond to conditions that exists independently from actions taken by the user. For example, Transition Conditions 6-8 may correspond to the passage of a predetermined amount of time or to a visibility condition of the application on a display screen of the client device.

The fourth state 108 includes an associated action, labeled Action 4 in FIG. 1A. Action 4 may be performed as a result of the transition into the fourth state 108. In some implementations, Action 4 may be performed a single time upon entry into the fourth state 108, but may not be repeated while the state machine remains in the fourth state 108. In some other implementations, Action 4 may be performed repeatedly while the state machine is in the fourth state 108. In some implementations, Action 4 may correspond, for example, to an action performed within an application rendered on a client device. In some other implementations, Action 4 may correspond to an action performed outside of the application rendered on the client device. For example, Action 4 may correspond to the display or removal of information presented to a user outside of the application. The state machine will remain in the fourth state 108 until one of Transition Conditions 9 and 10 becomes true. If Transition Condition 9 becomes true, the state machine will transition to the first state 102. If Transition Condition 10 becomes true, the state machine will transition to the second state 104.

Similar to the transition conditions described above, Transition Conditions 9 and 10 may each correspond to the occurrence of an action performed by a user of the client device. In some other implementations, Transition Conditions 9 and 10 may instead correspond to conditions that exists independently from actions taken by the user. For example, Transition Conditions 9 and 10 may correspond to the passage of a predetermined amount of time or to a visibility condition of the application on a display screen of the client device.

In some implementations, the state machine can transition between the first state 102, the second state 104, the third state 106, and the fourth state 108 indefinitely, based on the occurrence of the Transition Conditions 1-10 over time. For example, in implementations in which the state machine represents an application, the state machine can transition between the states shown in the state transition diagram 100 until the application is terminated. It should be noted that the state transition diagram 100 is intended to provide a complete list of states and transition conditions for its respective state machine. That is, the state machine cannot transition into any state not shown in the state transition diagram 100, and the transition conditions exiting each state represent a complete list of possible conditions when the state machine is in each respective state. However, it should also be noted that the state transition diagram 100 is illustrative only, and in some implementations may include more or fewer states without departing from the scope of this disclosure. In addition, each state may include any number of associated actions. States may include different numbers of actions (e.g. a first state 102 may include one action, a second state 104 may include two actions, or vice versa.). In some implementations, an electronic notification queue may be used to implement the state machine represented by the state transition diagram 100, as described further below in connection with FIGS. 1B and 1C.

Figure 1B:
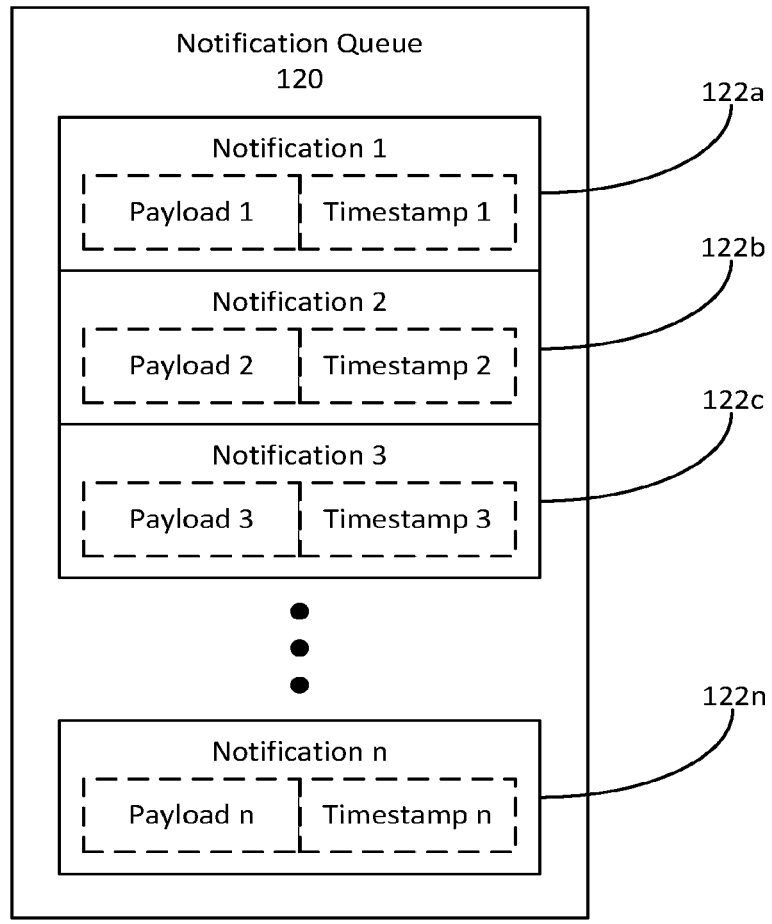
FIG. 1B is an example representation of a notification queue that can be used to implement the state machine represented by the state transition diagram of FIG. 1A, according to an illustrative implementation.
Figure 1C:
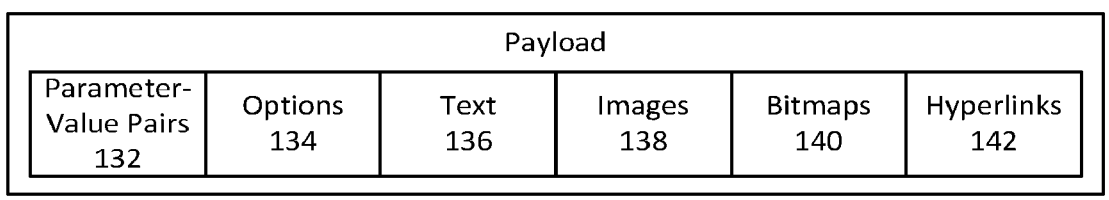
FIG. 1C is an example representation of a payload of a notification that may be present in the notification queue shown in FIG. 1B, according to an illustrative implementation.

FIG. 1B is an example representation of a notification queue 120 that can be used to implement the state machine represented by the state transition diagram 100 of FIG. 1A, according to an illustrative implementation. The notification queue 120 includes sequentially numbered notifications labeled 122a-122n (generally referred to as notifications 122). Each notification 122 includes a respective payload and a respective timestamp. FIG. 1C is an example representation of a payload of a notification 122 that may be present in the notification queue 120 shown in FIG. 1B, according to an illustrative implementation. FIGS. 1B and 1C are described together below, with reference to the state transition diagram 100 shown in FIG. 1A.

In some implementations, the notification queue 120 may be maintained in a computer memory. For example, the notification queue 120 can be implemented as any type of data structure, such as an array, a linked list, or a circular buffer, stored in a computer memory and accessible by a processor associated with the computing device, which may be a client device on which an application is rendered. In some other implementations, the queue may instead be maintained remotely from the client device, for example on a server communicatively coupled to the client device. Notifications 122 may be generated by the server and stored in the queue in sequential order. In some implementations, each notification 122 may be formatted according to a notification application programming interface (API). Some notification APIs may be provided as part of a computer operating system, such as the Windows® operating system developed by Microsoft Corporation or the macOS® operating system developed by Apple Inc. In some other implementations, the notification API may be provided as part of a mobile operating system such as the iOS™ operating system developed by Apple Inc. or the Android™ operating system developed by Alphabet Inc. In still other implementations, the notification API may be provided as part of an application, such as a web browser. For example, the notification may be provided as part of the Chrome™ web browser application developed by Alphabet Inc.

Each notification 122 may include data, referred to generally as a payload. As depicted in FIG. 1C, the payload for a notification 122 can include parameter-value pairs 132. In some implementations, the payload may include options 134. In some implementations, the payload may include text 136. In some implementations, the payload may include images 138. In some implementations, the payload may include bitmaps 140. In some implementations, the payload may include hyperlinks 142. It should be understood that the components of the payload as shown in FIG. 1C are illustrative only, and other components may be included, or a subset of the components included, such as text and hyperlinks, images and options, text and images, etc. In some implementations, one or more notifications 122 in the notification queue 120 may include more or fewer components than those shown in FIG. 1C. In general, the components of the payload for a notification represent information that can be used for displaying the notification, retiring the notification, and/or allowing a user to interact with the notification. For example, the text 136 may include textual data to be displayed along with the notification in order to provide information to the user, while the images 138 and bitmaps 140 may include information to be displayed to the user as graphical content, which may correspond, for example, to selectable buttons. The hyperlinks 142 may be displayed and selected by the user of the client device to transmit a packet or request (e.g. hyptertext markup language (HTML) request, API request, or other application or session layer request, etc.) to cause a remote server to perform an action. Various other information may be included in the options 134 and parameter-value pairs 132. For example, in some implementations, the parameter-value pairs 132 and options 134 may include information corresponding to a duration of time for which their respective notification 122 is to be displayed on the client device, or a particular time at which their respective notification is to be retired by the notification API.

The notification queue 120 can be used to facilitate implementation of the state machine represented by the state transition diagram 100. For example, the notifications 122 can serve as triggers or events for satisfying the transition conditions for moving between states in the state transition diagram 100. In some implementations, for example, delivery of a notification 122 can be an event that may satisfy (or partially satisfy) one or more of the transition conditions of the state transition diagram 100. Similarly, retirement of a notification 122 also can be an event that may satisfy one or more of the transition conditions of the state transition diagram 100. In some implementations, the transition conditions also may be satisfied when a user interacts with an active notification 122, such as by selecting a button or hyperlink associated with the active notification 122.

In some implementations, timing may be incorporated into the transition conditions of the state transition diagram 100. The timestamps for each notification 122 can help to determine when such time sensitive conditions are satisfied. For example, in some implementations, each notification 122 may be delivered at the time associated with its timestamp, and the server that generates the notifications 122 may be configured to ensure that sequential notifications 122 have timestamps that are spaced by a predetermined time. In some implementations, each notification 122 also may include timestamp information corresponding to a time at which the notification 122 should be retired after it is displayed. In some other implementations, an active notification 122 can be retired automatically upon delivery of the next notification 122.

Figure 2:
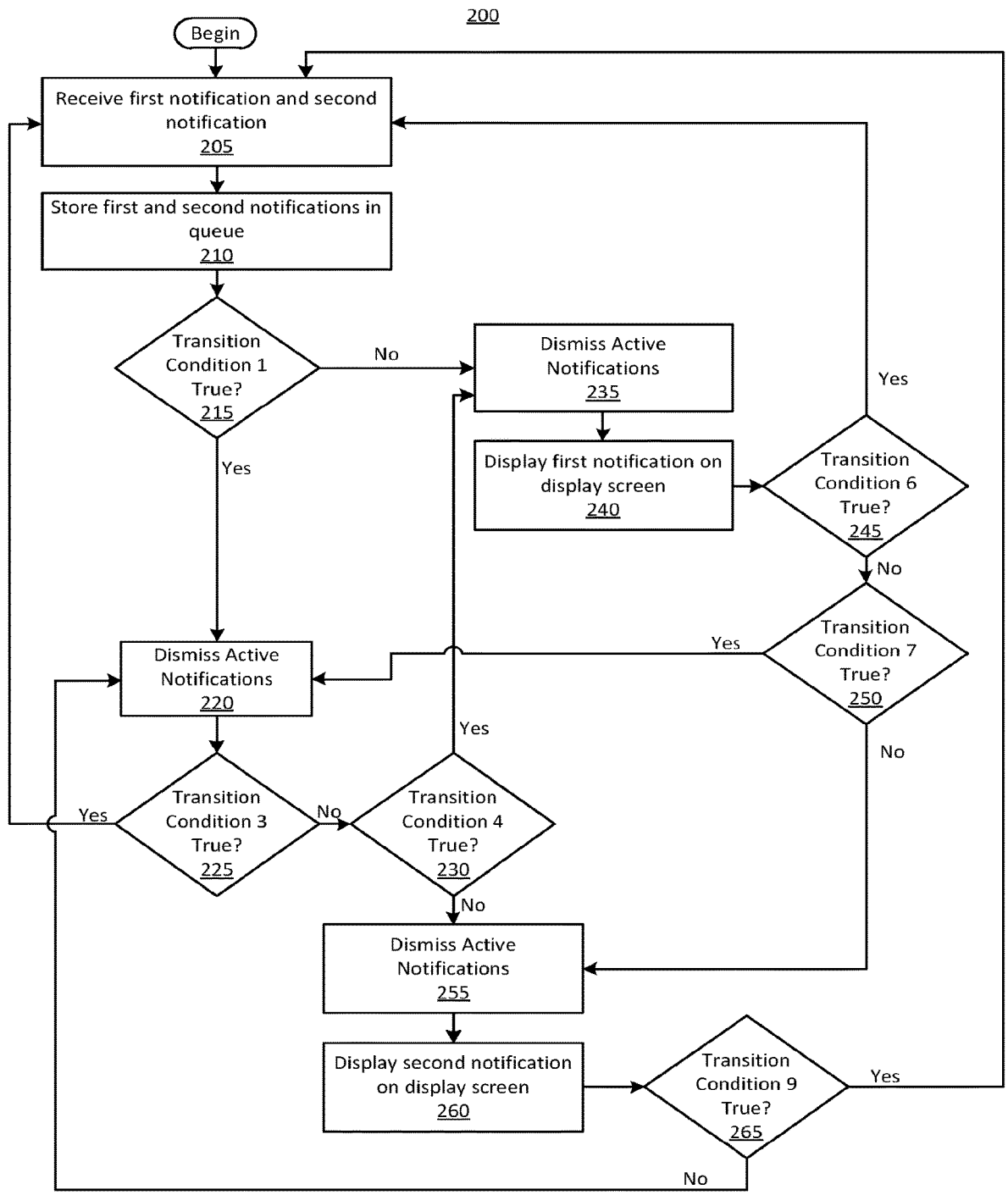
FIG. 2 is a flowchart illustrating an example method corresponding to the state transition diagram shown in FIG. 1A, according to an illustrative implementation.

FIG. 2 is a flowchart illustrating an example method 200 corresponding to the state transition diagram 100 shown in FIG. 1A, according to an illustrative implementation. In FIG. 2, rectangular boxes can represent the actions performed in the various states, and diamond-shaped boxes represent the conditions for transitioning between the states of the state transition diagram 100. As discussed above, it should be noted that the state transition diagram 100 is intended to provide a complete list of states and transition conditions for its respective state machine. Thus, it is assumed that the state machine cannot transition into any state not shown in the state transition diagram 100, and that the transition conditions for exiting each state represent a complete list of possible conditions when the state machine is in each respective state. These assumptions also apply to the flowchart shown in FIG. 2.

Referring again to FIG. 1A and FIG. 2, the method 200 begins by entering Block 205, in which first and second notifications are received by, for example, a client device. In some implementations, the notifications can be generated and transmitted by a remote server communicatively coupled to the client device, and may be delivered to the client device along with a content item to be displayed on a display screen of the client device. In some implementations, the notifications may be similar to the notifications 122 described above in connection with FIGS. 1B and 1C. The method 200 proceeds from Block 205 to Block 210, in which the client device stores the first and second notifications in a queue. For example, the first and second notifications can be stored in a queue similar to the notification queue 120 shown in FIG. 1B, which can be implemented as any type of data structure. In some implementations, the steps of the method 200 performed in Blocks 205 and 210 may correspond to Action 1 of the first state 102 for the state transition diagram 100.

As described above, the state machine transitions out of the first state 102 when either Transition Condition 1 or Transition Condition 2 becomes true. This is represented by Block 215, in which the client device can determine whether Transition Condition 1 is true. If so, the method 200 proceeds to Block 220, which can correspond to the second state 104 of the state transition diagram 100. If Transition Condition 1 is not true, then Transition Condition 2 must be true at Block 215, and the method 200 proceeds to Blocks 235 and 240, which may correspond to the third state 106 of the state transition diagram 100. In some implementations, Transition Conditions 1 and 2 may each correspond to a visibility state of a content item displayed on a display screen of the client device. For example, Transition Condition 1 may correspond to the content item being visible on the display screen, and Transition Condition 2 may correspond to the content item being hidden (or partially hidden) by other applications on the display screen.

At Block 220, corresponding to the second state 104 of the state transition diagram 100, the client device causes any active notifications to be dismissed. For example, in implementations in which Transition Condition 1 corresponds to the content item being visible, this step may be performed because it is not necessary for a user of the client device to interact with a notification, as the visible content item can be easily interacted with directly by the user. As described above, the state machine represented by the state transition diagram 100 transitions out of the second state 104 when any one of the conditions 3-5 is true. This is represented by Blocks 225 and 230. Thus, at Block 225, the client device can determine whether Transition Condition 3 is true and, if so, the method proceeds back to Block 205, which can represent the first state 102. If Transition Condition 3 is not true, the method 200 proceeds to Block 230, in which the client device can determine whether Transition Condition 4 is true. If so, the method proceeds Block 235, which can represent the third state 106. Otherwise, when Transition Conditions 3 and 4 are determined not to be true, and Transition Condition 5 is true, the method 200 proceeds to Block 255, representing the fourth state 108 of the state transition diagram 100.

Referring again to Block 235, which can represent an action performed in the third state 106, the client device can cause any active notifications to be dismissed, and the method can then proceed to Block 240, in which the client device can cause the first notification to be displayed on the display screen of the client device. The steps of the method 200 shown in Blocks 235 and 240 can together correspond to Action 3 performed in the third state 106 of the state transition diagram 100. In some implementations, the client device can remove the first notification from the queue at substantially the same time as the first notification is displayed, leaving only the second notification remaining in the queue. In some implementations, the first notification may include one or more interactive elements, such as selectable hyperlinks or buttons, which a user of the client device may select using a pointing device. Such interactive elements may be useful in instances in which the content item is hidden from view and may not be directly accessible by the user. Thus, Action 3 performed in the third state 106 (i.e., Blocks 235 and 240 of the method 200) may allow a user to interact with a hidden content item by providing the first notification for display on the display screen of the client device.

As described above, the transition out of the third state 106 occurs when one of Transition Conditions 6-8 is true. This is represented by Blocks 245 and 250. Thus, at Block 245, the client device can determine whether Transition Condition 6 is true and, if so, the method proceeds back to Block 205, which can represent the first state 102. If Transition Condition 6 is not true, the method 200 proceeds to Block 250, in which the client device can determine whether Transition Condition 7 is true. If so, the method proceeds Block 255, which can represent the fourth state 108. Otherwise, when Transition Conditions 6 and 7 are determined not to be true, and Transition Condition 8 is true, and the method 200 proceeds to Block 220, representing the second state 104 of the state transition diagram 100.

Referring now to Block 255, which can represent an action performed in the fourth state 108, the client device can cause any active notifications to be dismissed, and the method can then proceed to Block 260, in which the client device can cause the second notification to be displayed on the display screen of the client device. The steps of the method 200 shown in Blocks 255 and 260 can together correspond to Action 4 performed in the fourth state 108 of the state transition diagram 100. In some implementations, the client device can remove the second notification from the queue at substantially the same time as the second notification is displayed. In some implementations, the second notification may include one or more interactive elements, such as selectable hyperlinks or buttons, which a user of the client device may select using a pointing device. Such interactive elements may be useful in instances in which the content item is hidden from view and may not be directly accessible by the user. Thus, Action 4 performed in the fourth state 108 (i.e., Blocks 255 and 260 of the method 200) may allow a user to interact with a hidden content item by providing the first notification for display on the display screen of the client device. In some implementations, the interactive elements included in the second notification may be different from those included in the first notification. For example, the second notification may be displayed after the first notification has been displayed earlier, at which time the user may have additional or different options for interacting with the content item. In some implementations, at least one of the interactive elements of the second notification may allow the user to skip the content item (e.g., a media file) that is currently playing on the client device.

As described above, the state machine transitions out of the fourth state 108 when either Transition Condition 9 or Transition Condition 10 becomes true. This is represented by Block 265, in which the client device can determine whether Transition Condition 9 is true. If so, the method 200 proceeds to Block 205, which can correspond to the first state 102 of the state transition diagram 100. If Transition Condition 9 is not true, and Transition Condition 10 must be is true at Block 265, the method 200 proceeds to Block 220, which may correspond to the second state 104 of the state transition diagram 100. In some implementations, Transition Condition 9 may correspond to a new content item being displayed on a display screen of the client device. Thus, the method 200 proceeds back to Block 205, in which first and second notifications associated with the new content item can be received. Transition Condition 10 may correspond to the content item becoming visible on the display screen. When the content item becomes visible, it may not be necessary for notifications to be displayed because the user can instead interact with the content item directly, rather than via a notification. Thus, the method 200 can proceed to Block 220, in which any active notifications are dismissed.

Figure 3:
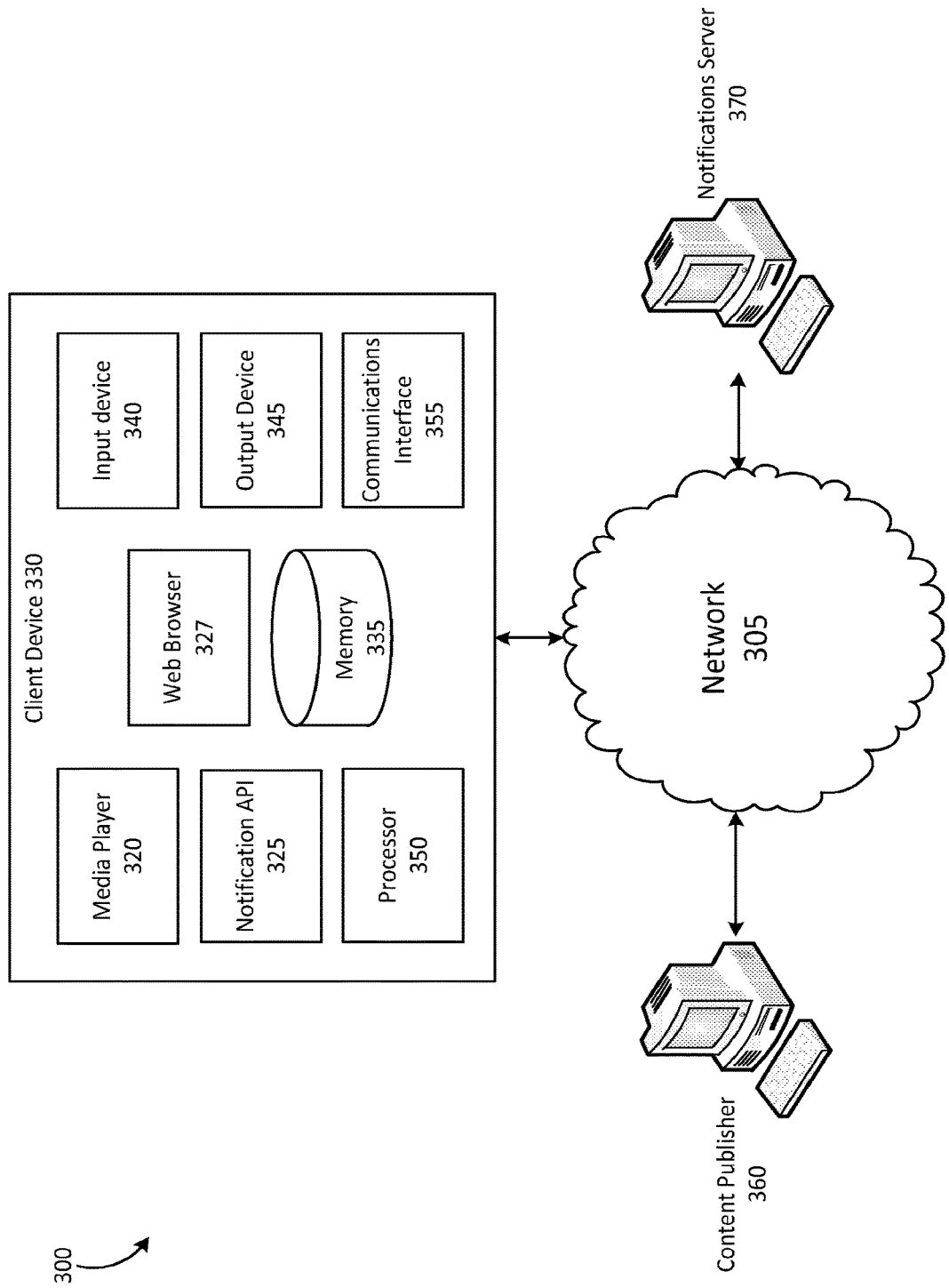
FIG. 3 is a block diagram illustrating a general architecture for a computing environment that may be employed to implement elements of the systems and methods described and illustrated herein, according to an illustrative implementation.

FIG. 3 is a block diagram illustrating a general architecture for a computing environment 300 that may be employed to implement elements of the systems and methods described and illustrated herein, according to an illustrative implementation. The environment 300 can include several computing devices including a client device 330, a content publisher 360, and a notifications server 370, which may be communicatively coupled to one another via a network 305. Each of the client device 330, a content publisher 360, and a notifications server 370 can include an individual computer or server, or multiple computers or servers. In the latter case, the multiple computers or servers can reside together in a single location such as a data center, or spread across multiple data centers. In some implementations, functions of two or more of the client device 330, a content publisher 360, and a notifications server 370 can be combined in a single computing system. For example, in some implementations the functions of the content publisher 360 and the notifications server 370 can be performed by a single, shared server or data center.

The client device 330 can include a media player 320, which may be configured to play content items such as audio and/or video files. The client device 330 includes a web browser 327, which can be configured to display online documents as well as to render multimedia content, such as streaming audio and/or video files. The client device 330 further includes a notification API 325. As discussed above, in some implementations the notification API 325 may be provided as part of a computer operating system, a mobile operating system, or as part of an application, such as the web browser 327.

The client device 330 also can include one or more processors 350 communicatively coupled to at least one memory 335, one or more communications interfaces 355, one or more output devices 345 (e.g., one or more display units), and one or more input devices 340 (e.g., one or more touchscreens, keypads, microphones, or the like). The memory 335 can include computer-readable storage media, and can store computer instructions such as processor-executable instructions for implementing the operations described herein. The memory 335 can be configured to store the data received from the content publisher 360 and the notifications server 370, for example. The at least one processor 350 can execute instructions stored in the memory 335 and can read from or write to the memory information processed and or generated pursuant to execution of the instructions.

The processors 350 can be communicatively coupled to or can control the at least one communications interface 355 to transmit or receive information pursuant to execution of instructions. For example, the communications interface 355 can be coupled to a wired or wireless network, bus, or other communication means and can allow the client device 330 to transmit information to or receive information from the content publisher 360 and the notifications server 370. Thus, the one or more communications interfaces 355 can facilitate information flow between the components of the environment 300. Examples of communications interfaces 355 include user interfaces.

The one or more output devices 345 can allow information to be viewed or perceived in connection with execution of the instructions. The one or more input devices 340 can allow a user to make manual adjustments, make selections, enter data or other information, or interact in any of a variety of manners with the processor during execution of the instructions.

The content publisher 360 can publish primary content including multimedia content such as audio and/or video files, for use by the client device 330. The client device 330 can request content items from the content publisher 360, and can render the content items for display, for example using the media player 320 or the web browser 327. To retrieve a content item for display in a video block of a web page, for example, the client device 330 can send a request to the content publisher 360. The client device 330 can receive, in response to the request, the streaming video for display in the video block.

Video content displayed, for example, in the web browser 327 or the media player 320 can include user-selectable content that allows a user to engage with the video content. For example, a user may be able to open a different web page associated with the video content, or may elect to skip the remainder of the video content after viewing only a portion of the video content. However, when video content is playing in a background application or in a browser tab that is not in focus (e.g. front-most or active in a windowing system, visible in an uncovered window, in a front tab of a browser, particularly in full-screen operating systems such as mobile operating systems, etc.) on the client device 330, the user may have difficulty locating the source of the video content and may therefore be unable to engage with it.

To allow the user to interact with such hidden or partially hidden content, notifications can be delivered to the user and used to maintain a state machine representation of the content in a manner similar to that described above in connection with FIGS. 1A-1C and 2. The notifications can allow the user to engage with the background video content item without having to locate the browser tab of the web browser 327 or the media player 320 that is the source of the video content. For example, the notifications can include buttons or selectable hyperlinks configured to perform actions such as bringing the background video content into focus on the device, pausing the background video content, muting the background video content, or skipping the background video content. In some implementations, a pair of notifications can be generated by the notifications server 370, transmitted to the client device 330, and stored in a queue on the client device 330. In some other implementations, the notifications queue can instead be maintained by the notifications server 370. The first notification can be displayed on the client device 330 immediately after the video content begins to play in the background, and can include interactive elements to allow the user to bring the video content into focus or to open a new web page related to the video content. In some implementations, after a predetermined duration of time, the second notification can be displayed on the client device 330. The second notification can include an interactive element to allow the user to skip the video content item. In some implementations, the notifications can be delivered using the notification API 325, for example. This functionality is described more fully below in connection with FIGS. 4 and 5.

Figure 4:
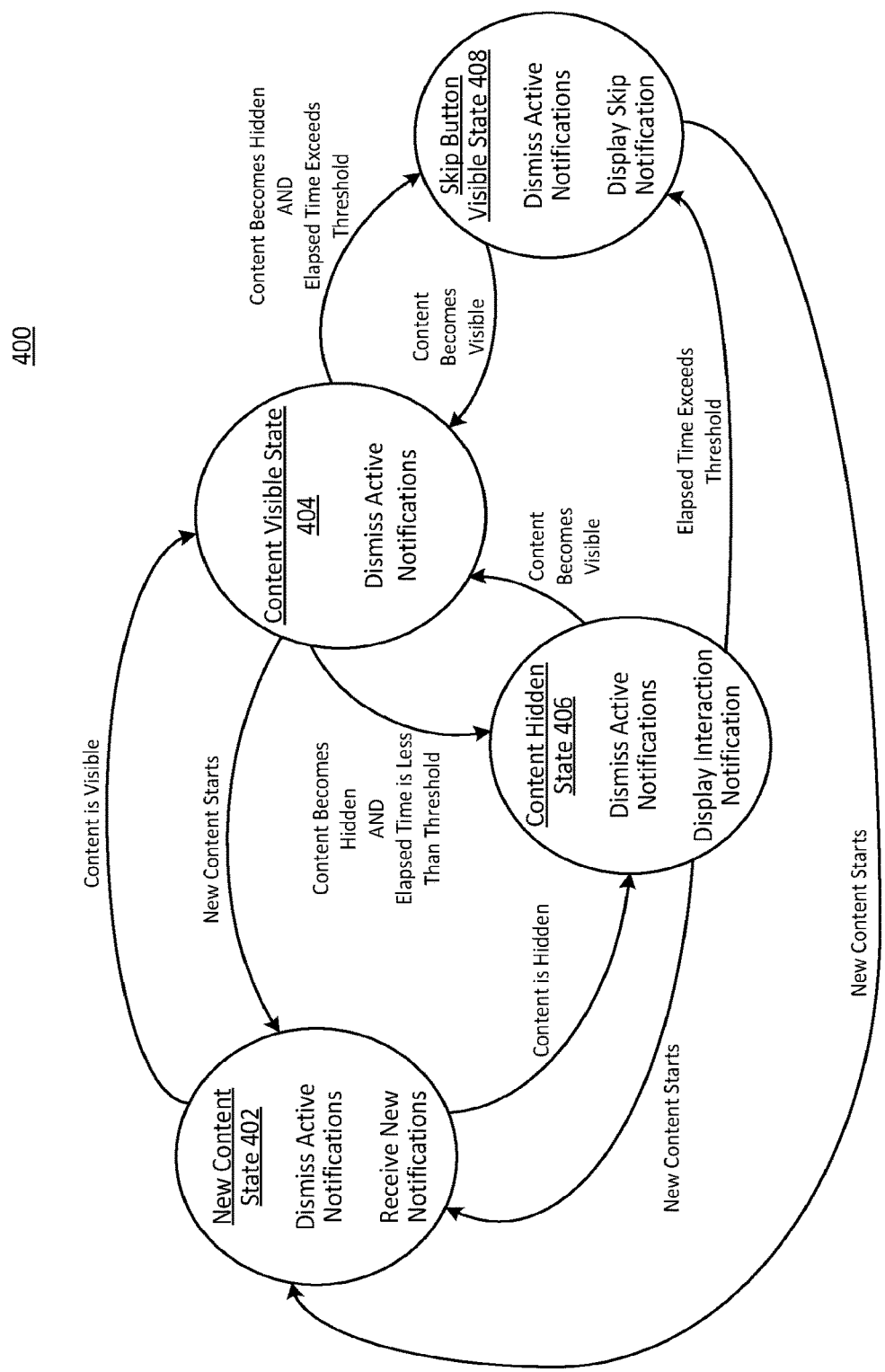
FIG. 4 is a state transition diagram for an example finite-state machine representing a system for allowing a user to interact with content delivered to a client device via a computer network, according to an illustrative implementation.

FIG. 4 is a state transition diagram 400 for an example finite-state machine representing a system for allowing a user to interact with content delivered to a client device via a computer network, according to an illustrative implementation. In some implementations, the content may be generated, for example, by a content publisher such as the content publisher 360 and delivered to a client device such as the client device 330 shown in FIG. 3. The state transition diagram 400 can represent a specific example of the more generic state transition diagram 100 shown in FIG. 1, and can allow a state machine representation of one or more content items to be maintained on the client device via the use of a notification queue, such as the notification queue 120 shown in FIG. 1B.

The state transition diagram 400 includes four states: a new content state 402, a content visible state 404, a content hidden state 406, and a skip button visible state 408. Arrows between the states are labeled with the conditions that are sufficient to cause transition from one state to the next. In general, the state transition diagram 400 begins in the new content state 402 or may enter state 402 upon initialization, startup, instantiation, etc. In this state, any active notifications are dismissed. At some subsequent time, while in this state, new notifications may be received by the client device. For example, in some implementations, the client device may receive two notifications corresponding to an item of new content. Each of the notifications may include interactive elements such as selectable buttons to allow a user of the client device to interact with the content item via the notification when the content item may be hidden (or partially hidden) from view within the display screen of the client device. After the active notifications are dismissed and the new notifications are received, the state machine transitions to either the content visible state 404 or the content hidden state 406, depending on whether the content item is visible on the display screen of the client device, as shown by the arrows exiting the new content state 402. In the content visible state 404, the only action performed is the dismissal of active notifications associated with the content item. For example, because the content is visible on the display screen (e.g., within a web browser or media player application executing or otherwise rendered on the client device), a user can readily interact with the content item directly, and therefore notifications associated with the content item are unnecessary.

On the other hand, in the content hidden state 406, the user may be unable to interact with the content directly because the content is not visible on the display screen of the client device. As a result, in the content hidden state 406, active notifications are dismissed and an interaction notification is displayed. The interaction notification may be, for example, a popup window including interactive elements to allow the user to interact with the hidden content item. In some implementations, the interactive elements may include buttons enabling the user to pause playback of the content item or to change an audio volume of the content item. The interactive elements also may include hyperlinks to web pages associated with the content item. For example, the interaction notification may include a hyperlink to a website associated with a publisher of the content item.

In some implementations, the client device may store the interaction notification and may deliver the interaction notification upon entry into the content hidden state 406. In some implementations, the client device may request that the interaction notification be delivered by another computing device, such as a remote server. In implementations in which the content item is an embedded media file within a website, the client device may request that a server hosted with the website deliver the interaction notification to the client device. In some implementations, servers hosted with certain domains may be unable to deliver notifications to the client device. Thus the client device may instead request that another server deliver the interaction notification (e.g., a server that hosts the media file rather than the server that hosts the website on which the media file is embedded).

From the content visible state 404, the state machine may transition to either the new content state 402, the content hidden state 406, or the skip button visible state 408. For example, if a new content item begins playing, the state machine transitions to the new content state 402, in which active notifications are dismissed and the client device receives new notifications associated with the new content items. If content becomes hidden while in the content visible state 404, the state machine transitions to either the content hidden state 406 or the skip button visible state 408, depending on an elapsed time associated with the content item. For example, in some implementations the content item may become skippable after a predetermined period of time, but may not be skippable prior to the predetermined time period. Thus, if the content becomes hidden and the elapsed time is less than the predetermined threshold, the state machine transitions from the content visible state 404 to the content hidden state 406. However, if the content becomes hidden and the elapsed time exceeds the predetermined threshold (i.e., the content item is skippable), the state machine transitions from the content visible state 404 to the skip button visible state 408.

In the skip button visible state 408, active notifications are dismissed and a skip notification is displayed on the client device. In some implementations, the skip notification may include any of the interactive elements described above in connection with the interaction notification that is displayed in the content hidden state, in addition to an interactive element that allows the user to skip the content item.

From the content hidden state 406, the state machine can transition into the new content state 402 if new content begins playing. If the existing content becomes visible, the state machine can instead transition into the content visible state 404, in which active notifications are dismissed. If the content remains hidden and no new content starts, the state machine transitions from the content hidden state 406 into the skip button visible state 408 when the elapsed time for the content item exceeds the predetermined threshold, thereby making the content item skippable. Similarly, from the skip button visible state 408, the state machine can transition into the new content state 402 if new content begins playing. If the existing content becomes visible, the state machine can instead transition into the content visible state 404, in which active notifications are dismissed.

Figure 5:
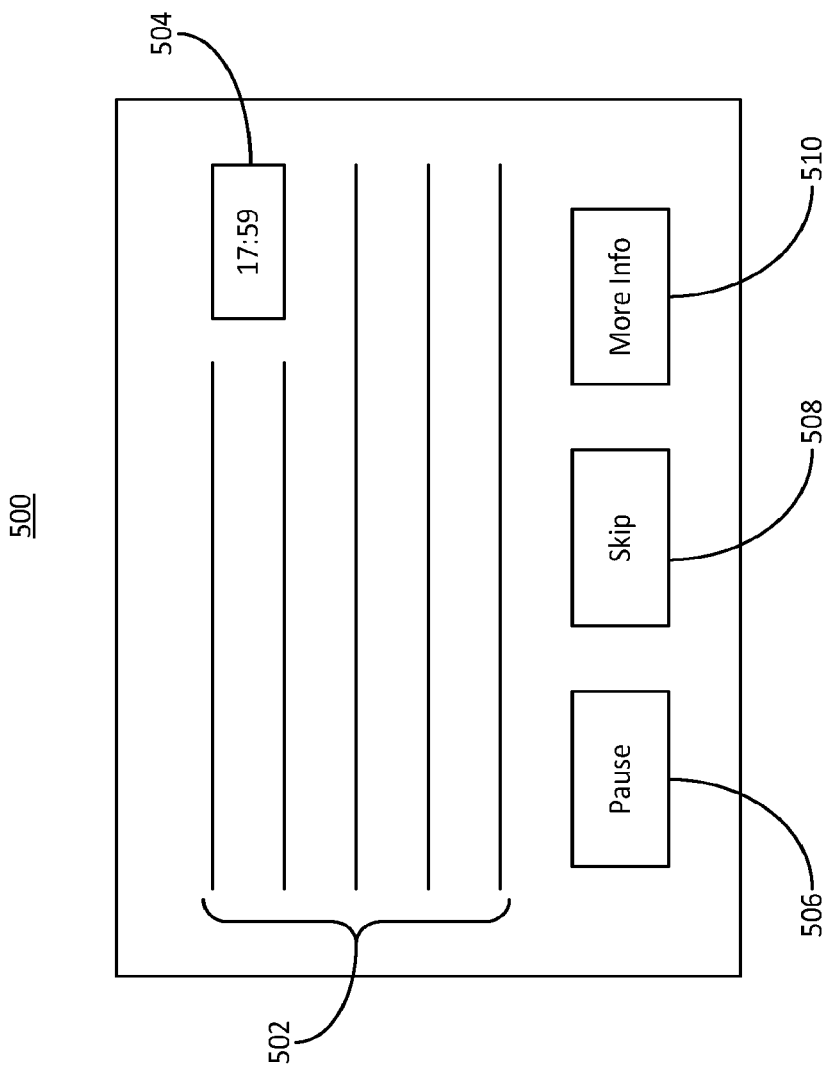
FIG. 5 is an example graphical representation of an electronic notification from a queue of notifications that can be used to implement the state transition diagram shown in FIG. 4, according to an illustrative implementation.

FIG. 5 is an example graphical representation of an electronic notification 500 from a queue of notifications that can be used to implement the state transition diagram shown in FIG. 4, according to an illustrative implementation. The notification 500 can include textual information 502, elapsed time information 504, a pause button 506, a skip button 508, and a more info button 510. In some implementations, the notification 500 can be delivered as a popup window shown on a display screen of a client device. It should be understood that the format of the notification 500 shown in FIG. 5 is illustrative only. In some implementations, the notification 500 may include additional or different components than those shown in FIG. 5.

The textual information 502 may include any text-based information relevant to the content item. For example, in some implementations, the textual information 502 may include a song title, album title, or artist name for an audio content item that is playing. In some other implementations, the textual information 502 may include information related to a person or institution who created or published the content item. In still other implementations, the textual information 502 may include information relating to a promotion associated with the content item. For example, the textual information may include information advertising a discount or other promotional pricing on a product or service associated with the content item. In such implementations, the more info button 510 may be selectable by a user in order to display a web page allowing the user to obtain the advertised discount. The elapsed time information 504 can display the total time for which the content item has been displayed.

Each of the pause button 506, the skip button 508, and the more info button 510 can be an interactive element that a user can select, for example using an input device associated with the client device. Selecting the pause button 506 may stop playback of the content item, while selecting the skip button 508 may cause the content item to be skipped and a new content item to be started instead. It should be understood that, in some implementations, a notification may not include a skip button 508. For example, as described above, the content item may only become skippable after the elapsed time during which the content item has played exceeds a predetermined threshold. Therefore, notifications displayed before the elapsed time exceeds the predetermined threshold may not include a skip button 508. It should also be understood that the notification 500 may include additional or different buttons not illustrated in FIG. 5. In some implementations, the notification 500 may include a mute button, which may be selectable by a user of the client device to mute audio associated with the content item. It should also be understood that the components of the notification 500 may be displayed in a different format. For example, in some implementations the notification 500 may be displayed as a banner presented along an edge of a web browser application in which the content item is playing.

The following example implementation of maintaining a client side state machine via notification queues is provided for illustrative purposes, but is not intended in any way to limit the scope of this disclosure. Rather, the following description represents one potential use case or environment in which notification queue-based state machines may be helpful. In particular, the implementation that follows allows significant bandwidth and energy savings by reducing or eliminating many client-server communications that would ordinarily be required to transition between various presentation states.

Referring again to FIGS. 4 and 5, a user may view content items in a web browser application on a client device. In some implementations, the web browser application may be configured to allow for multiple tabs to be opened simultaneously, and the client device may be configured to allow multiple different applications to be executing and displayed simultaneously along with the web browser application. Using the web browser application, the user may start a new content item, for example by selecting a link that opens a web page which plays an embedded video file. The use of the web browser application to play such a video file can be modeled using the state transition diagram 400 shown in FIG. 4.

As a result of the user starting the video file, the state transition diagram can enter the new content state 402. In this state, active notifications can be dismissed, and new notifications can be received at the client device. The new notifications may include an interaction notification and a skip notification, as described above. In some implementations, the notifications may be stored in a notification queue maintained on the client device.

If the user starts the video file by selecting a link in an active tab of the web browser application, the video will likely be visible on the display of the client device. As a result, the state transition diagram transitions from the new content state 402 to the content visible state 404. In this state, active notifications are again dismissed. Generally, a notification may allow the user to interact with a content item when the content item is not visible on the client device. In the content visible state 404 however, this is unnecessary because the user may interact directly with the visible content, and therefore active notifications associated with the content can be dismissed. In this example, the user may later take an action that renders the video invisible, such as selecting another browser tab or another application that overlaps the web browser, such that the video becomes hidden or at least partially hidden.

As described above, there may be a predetermined time threshold at which the video becomes skippable. That is, the user may elect to skip the video after the video has played for the predetermined threshold of time, but may not elect to skip the video before the video has played for the predetermined duration of time. In this example, if the content becomes hidden shortly after it begins playing (i.e., before the predetermined time threshold has elapsed), the state transition diagram 400 transitions to the content hidden state 406.

In the content hidden state 406, active notifications are dismissed, and the interaction notification is displayed. In some implementations, the interaction notification may be removed from the queue substantially simultaneously with its display on the client device. The interaction notification may include many of the features of the notification 500 described above in connection with FIG. 5, such as the pause button 506 and the more info button 510. However, the interaction notification may not include the skip button 508, as the video has not yet reached a skippable portion (i.e., the predetermined threshold has not yet elapsed). The user may interact with the video via the interaction notification. The user may select the pause button 506 to pause the video, or may select the more info button 510 to request a web page related to a provider of the video. When the elapsed time exceeds the predetermined threshold, the state transition diagram 400 transitions into the skip button visible state 408.

In the skip button visible state 408, active notifications (i.e., the interaction notification displayed in the content hidden state 406) are dismissed, and a skip notification is displayed. In some implementations, the skip notification may be removed from the queue substantially simultaneously with its display on the client device. The skip notification may include many of the features of the notification 500 described above in connection with FIG. 5, including the skip button 508, which can allow the user to skip the video via the skip notification. If the video becomes visible again, the state transition diagram 400 transitions back to state 404. If a new content item starts playing (e.g., if the user selects the skip button, cause a new content item to begin), the state transition diagram 400 transitions back to the new content state 402.

Accordingly, by using the client-side notification queue to store a representation of a current state of a state machine (e.g. identifying playback and visibility of the content item), a server need not maintain a separate state machine for the client device. This may save memory on the server, as well as reducing bandwidth necessary for inter-device communications. Furthermore, this may provide substantial benefits for scalability: because the server need not maintain a state machine for each client device, the server may serve thousands, tens of thousands, hundreds of thousands, or millions of client devices simultaneously and asynchronously without requiring maintaining corresponding thousands, tens of thousands, hundreds of thousands, or millions of state machines in memory. This may similarly reduce processor loads on the server, as well as reducing server power consumption or waste heat generation.

The subject matter and the operations described herein can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing system or apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices). The operations described in this specification can be implemented as operations performed by a data processing apparatus on data stored on one or more computer-readable storage devices or received from other sources.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The term "data processing system" or "computing device" "module" "engine" or "component" encompasses apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination thereof. The apparatus and execution environment can realize various different computing model infrastructures, such as web services, distributed computing and grid computing infrastructures. The client device 330 or components thereof can include or share one or more data processing apparatus, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the client device 110) to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

The subject matter described herein can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or a combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The environment 300 can include clients and servers. A client and server are generally remote from each other and typically interact through a communication network (e.g., the network 305). The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server (e.g., received by the client device 330 from the content publisher 360, or the server 370).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, media player 320, the notification API 325, or the web browser 327 can be a single module, a logic device having one or more processing circuits, or part of one or more servers of the client device 330.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "an alternate implementation," "various implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of" 'A' and 'B' can include only 'A', only 'B', as well as both 'A' and 'B'.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method, comprising:
   receiving, by an application executing on a computing device from a server, a content item and a notification;
   displaying, by the application, the notification on a display screen of the computing device, responsive to a portion of the content item being presented by the computing device but not visible on the display screen of the computing device;
   dismissing, by the application, the notification responsive to expiration of a timer.

2. The method of claim 1, wherein the content item comprises video content.

3. The method of claim 2, further comprising setting the timer, responsive to display of the content item by the second application, to a predetermined value corresponding to a duration of a non-skippable portion of the video content.

4. The method of claim 3, wherein the notification includes a user interface element, the method further comprising:
   detecting, by the application while the portion of the content item is being presented by the computing device but not visible on the display screen of the computing device, an interaction with the user interface element; and
   activating a window of a second application comprising the video content, responsive to detecting the interaction with the user interface element.

5. The method of claim 2, wherein the notification includes a second user interface element, the method further comprising:
   detecting, by the application, an interaction with the second user interface element; and
   providing a command to pause the video content, by the application to a second application, responsive to detecting the interaction with the second user interface element.

6. The method of claim 2, wherein the notification includes a third user interface element, the method further comprising:
   detecting, by the application, an interaction with the third user interface element; and
   providing a command to transmit a request for a second content item, by the application to a second application, responsive to detecting the interaction with the third user interface element.

7. The method of claim 2, further comprising:
   receiving, by the application, a second notification, wherein the second notification includes a fourth user interface element;
   detecting, by the application, an interaction with the fourth user interface element; and
   providing a command to skip a remainder of the video content, by the application to a second application, responsive to detecting the interaction with the fourth user interface element.

8. The method of claim 1, further comprising:
   storing the notification, and a second notification and a third notification in a notification queue in a memory of the computing device; and
   removing, by the application responsive to display of the content item by a second application executing on the computing device, the third notification from the queue.

9. The method of claim 1, further comprising:
   sending, by the application, a remote procedure call (RPC) to a second server, the RPC including information identifying the computing device and causing the second server to send the notification to the computing device.

10. The method of claim 1, further comprising activating the timer substantially concurrent with display of the content item.

11. A system comprising a client device comprising a processor executing a notification application and a timer; a memory device; and a network interface communicatively coupled to a server;

wherein the network interface is configured to receive, from the server, a content item and a notification;

wherein the notification application is configured to: display the notification on a display screen of the client device, responsive to a portion of the content item being presented by the computing device but not visible on the display screen of the computing device, and dismiss the first notification responsive to the expiration of the timer.

12. The system of claim 11, wherein the content item comprises video content.

13. The system of claim 12, wherein the timer is configured with a predetermined duration corresponding to a non-skippable portion of the video content.

14. The system of claim 13, wherein the notification includes a user interface element; and wherein the notification application is further configured to:

detect, while the portion of the content item is being presented by the computing device but not visible on the display screen of the computing device, an interaction with the first user interface element, and activate a window of a second application comprising the video content, responsive to detection of the interaction with the user interface element.

15. The system of claim 12, wherein the notification includes a second user interface element; and wherein the notification application is further configured to:

detect an interaction with the second user interface element; and provide a command to pause the video content, responsive to detection the interaction with the second user interface element.

16. The system of claim 12, wherein:

the notification includes a third user interface element;

the notification application is further configured to detect an interaction with the third user interface element; and the network interface is further configured to transmit a request for a second content item, responsive to detection of the interaction with the third user interface element.

17. The system of claim 12, wherein the notification application is further configured to:

receive a second notification, wherein the second notification includes a fourth user interface element;

detect an interaction with the fourth user interface element; and provide a command to skip a remainder of the video content, responsive to detection of the interaction with the fourth user interface element.

18. The system of claim 11, wherein the notification application is further configured to:

store the notification, and a second notification and a third notification in a notification queue in a memory of the computing device; and remove, responsive to the determination that the client device is in the first state, the third notification from the notification queue.

19. The system of claim 11, wherein the network interface is further configured to send a remote procedure call (RPC) to a second server, the RPC including information identifying the client device and causing the second server to send the notification to the client device.

20. The system of claim 11, wherein the timer is further configured to activate substantially concurrent with display of the content item.

* * * * *